(12) United States Patent
Lee

(10) Patent No.: US 12,434,526 B2
(45) Date of Patent: Oct. 7, 2025

(54) PRIORITY-BASED SUSPENSION CONTROL APPARATUS AND METHOD

(71) Applicant: HYUNDAI MOBIS CO., LTD., Seoul (KR)

(72) Inventor: Dong Yeoup Lee, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 115 days.

(21) Appl. No.: 18/467,853

(22) Filed: Sep. 15, 2023

(65) Prior Publication Data

US 2024/0262152 A1 Aug. 8, 2024

(30) Foreign Application Priority Data

Feb. 3, 2023 (KR) .................. 10-2023-0014925

(51) Int. Cl.
*B60G 17/0165* (2006.01)

(52) U.S. Cl.
CPC .... *B60G 17/0165* (2013.01); *B60G 2400/922* (2013.01); *B60G 2600/182* (2013.01)

(58) Field of Classification Search
CPC .......... B60G 17/0165; B60G 2400/922; B60G 2600/182; B60G 17/015; B60G 17/016; B60G 17/018; B60G 2400/204; B60G 2400/821; B60G 2400/824; B60G 2401/142; B60G 2401/16; B60G 2500/10; B60G 2500/20; B60G 2500/30; B60G 2800/85; B60G 2800/91; B60Y 2400/86
USPC .......................................................... 701/37
See application file for complete search history.

(56) References Cited

FOREIGN PATENT DOCUMENTS

CN 110450594 A * 11/2019 ......... B60G 17/0165
KR 10-2012-0051553 A 5/2012

* cited by examiner

*Primary Examiner* — Lindsay M Low
*Assistant Examiner* — Omar Morales
(74) *Attorney, Agent, or Firm* — NovoTechIP International PLLC (57) ABSTRACT

A priority-based suspension control apparatus includes a priority queue scheduler configured to receive forward situation information of a road, determine a priority of a forward situation that influences behavior of a vehicle, and generate a schedule for controlling a suspension system, according to the determined priority; and a suspension system control module configured to control, at a suspension system control start point before a designated control section is reached, the suspension system according to a suspension control mode outputted on the basis of the schedule generated according to the priority of the forward situation by the priority queue scheduler.

8 Claims, 4 Drawing Sheets

PRIORITY-BASED SUSPENSION CONTROL APPARATUS AND METHOD

CROSS-REFERENCE TO RELATED APPLICATIONS

This application claims priority from and the benefit of Korean Patent Application No. 10-2023-0014925, filed on Feb. 3, 2023, which is hereby incorporated by reference for all purposes as if set forth herein.

TECHNICAL FIELD

Exemplary embodiments of the present disclosure relate to a priority-based suspension control apparatus and method, and more particularly, to a priority-based suspension control apparatus and method capable of controlling a suspension system according to a priority among forward situation information of a road.

BACKGROUND

In general, the suspension system of a vehicle is installed by being connected with an axle, and controls vibration or shock received from a road surface while the vehicle is driven so that the vibration or shock is not directly transferred to a vehicle body, thereby preventing damage to the vehicle body, a passenger, a cargo, etc. and a safety accident and improving the ride comfort of the vehicle.

Such a suspension is also called a suspension device, and is composed of a chassis spring which relieves shock from a road surface, a shock absorber which improves ride comfort by controlling free vibration of the chassis spring, and a stabilizer bar which prevents rolling of a vehicle.

Recently, an electronically controlled suspension (ECS) which automatically adjusts the strength of a suspension depending on the situation or state of a road surface is being mounted in a vehicle. With the development of a self-driving vehicle, control of a suspension system using information on a forward road surface situation recognized through navigation information from a navigation system of the vehicle is increasing.

A conventional suspension control method using navigation information controls a suspension simply in order in which information on road surface situations such as a road type and an obstacle is inputted. Therefore, when road surface situations are close to each other, a problem may arise in that the possibility of suspension control situations to overlap or conflict with each other increases.

Accordingly, there is a need for a method for preventing a sudden change in suspension control scheme or frequent continuous control and enabling a suspension system to be controlled by preferentially using control information on a high-priority situation, thereby improving safety of a driver and a pedestrian and providing better steering stability and ride comfort to the driver and a passenger.

A background art of the present disclosure is disclosed in Korean Patent Laid-open Publication No. 10-2012-0051553 (published on May 22, 2012 and entitled "Method for Controlling Suspension of Vehicle and Detecting a Road").

SUMMARY

Various embodiments of the present disclosure are directed to a priority-based suspension control apparatus and method capable of controlling a suspension system according to a priority among forward situation information of a road.

In an embodiment, a priority-based suspension control apparatus may include: a priority queue scheduler configured to receive forward situation information of a road, determine a priority of a forward situation that influences behavior of a vehicle, and generate a schedule for controlling a suspension system, according to the determined priority; and a suspension system control module configured to control, at a suspension system control start point before a designated control section is reached, the suspension system according to a suspension control mode outputted on the basis of the schedule generated according to the priority of the forward situation by the priority queue scheduler.

When the schedule for controlling the suspension system is generated, the priority queue scheduler may calculate a remaining distance to a control section with a high priority, and, at the suspension system control start point before the designated control section is reached, may output the suspension control mode to the suspension system control module.

The priority queue scheduler and the suspension system control module may be controlled by a processor or are implemented in a form integrated with a processor.

The priority-based suspension control apparatus may control the suspension system in a default suspension control mode till the suspension system control start point before the designated control section is reached; from after the suspension system control start point before the designated control section is reached to till a suspension system control end point after the designated control section is passed, the priority-based suspension control apparatus may perform navigation-based suspension system control; and from after the suspension system control end point after the designated control section is passed, the priority-based suspension control apparatus may control the suspension system in the default suspension control mode again.

By calculating a remaining distance to a control section of the road which the vehicle is traveling on, which control section has a high priority in the vehicle through moved distance information of a navigation system, the priority-based suspension control apparatus may start control of the suspension system in a designated suspension control mode immediately before the vehicle enters the designated control section of the road, and may end the control of the suspension system in the corresponding suspension control mode after the vehicle exits the designated control section; and when situation information from the navigation is not received or the priority queue scheduler is empty by performing all controls scheduled in the priority queue scheduler, the priority-based suspension control apparatus may control the suspension system in the default suspension control mode.

The priority queue scheduler may identify information with a high priority among the forward situation information of the road, and may manage the information with a high priority as a queue; when a second priority situation with a high priority is successively included while suspension control is performed in a first priority situation with a low priority, the priority queue scheduler may control the suspension system in a suspension control mode corresponding to a second priority while controlling the suspension system in a suspension control mode corresponding to a first priority; and the priority queue scheduler may generate a schedule to control the suspension system in the suspension control mode corresponding to the first priority again when the second priority situation is ended.

The priority queue scheduler may receive forward situation information of a road, may identify a road type and road surface information, road curvature and slope information and safe driving information, and on the basis thereof, may determine a priority of a forward situation that influences behavior of the vehicle.

In an embodiment, a priority-based suspension control method may include: receiving forward situation information of a road, determining a priority of a forward situation that influences behavior of a vehicle, and generating a schedule for controlling a suspension system, according to the determined priority, by a priority queue scheduler; and controlling, at a suspension system control start point before a designated control section is reached, the suspension system according to a suspension control mode outputted on the basis of the schedule generated according to the priority of the forward situation by the priority queue scheduler, by a suspension system control module.

In the generating of the schedule for controlling the suspension system according to the priority, the priority queue scheduler may receive and store predesignated situation information from a navigation, may identify situation information with a high priority among the received situation information, may set a suspension control mode suitable for the identified situation information, and may manage the schedule of the suspension control mode according to a priority of each identified situation information.

In the controlling of the suspension system according to the suspension control mode outputted on the basis of the schedule generated according to the priority, the suspension system control module may check whether the priority queue scheduler is empty, may calculate, when the priority queue scheduler is not empty, a remaining distance to a section with a high priority in the priority queue scheduler, may perform, when a suspension system control start point is reached before the designated control section is reached, a navigation-based suspension control mode as a suspension control mode set in the priority queue scheduler, and may manage, when a suspension system control end point is exited after the designated control section is passed, a suspension control mode by changing a schedule to a next priority section in the priority queue scheduler.

According to the embodiments of the present disclosure, it is possible to provide a priority-based suspension control apparatus and method capable of controlling a suspension system according to a priority among forward situation information of a road.

DETAILED DESCRIPTION

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

Hereafter, a priority-based suspension control apparatus and method will be described with reference to the accompanying drawings through various exemplary embodiments.

It should be noted that the drawings are not to precise scale and may be exaggerated in thicknesses of lines or sizes of components for descriptive convenience and clarity only. Furthermore, the terms used herein are defined by taking functions of the disclosure into account and can be changed according to the intention of users or operators or the practice. Therefore, definition of the terms should be made according to the overall disclosures set forth herein.

Hereinafter, embodiments of the present disclosure will be described in detail with reference to the accompanying drawings so that the inventive concept may be readily implemented by those skilled in the art. However, it is to be noted that the present disclosure is not limited to an illustrative embodiment of the present inventive concepts but can be realized in various other ways. In the drawings, parts irrelevant to the description are omitted in order to clearly describe the present disclosure, and like reference numerals designate like parts throughout the specification.

Throughout the specification, when an element "includes" a component, this may indicate that the element does not exclude another component unless stated to the contrary, but can further include another component.

The embodiments described in this specification may be implemented with a method or process, a device, a software program, a data stream or a signal, for example. Although the embodiments have been discussed in the context of a single implementation (for example, only in a method), the discussed features can be implemented in other forms (for example, device or program). The device can be implemented in proper hardware, software, firmware and the like. The method can be implemented in a device such as a processor which generally refers to a processing device including a computer, a microprocessor, an integrated circuit or a programmable logic device.

In the present disclosure, by using a priority queue scheduler, road surface information, road slope and curvature information and safe driving information among forward situations of a road are identified, priorities of forward situations that influence the behavior of a vehicle are determined, and a suspension system is controlled according to a schedule configured according to the determined priorities.

Figure 1:
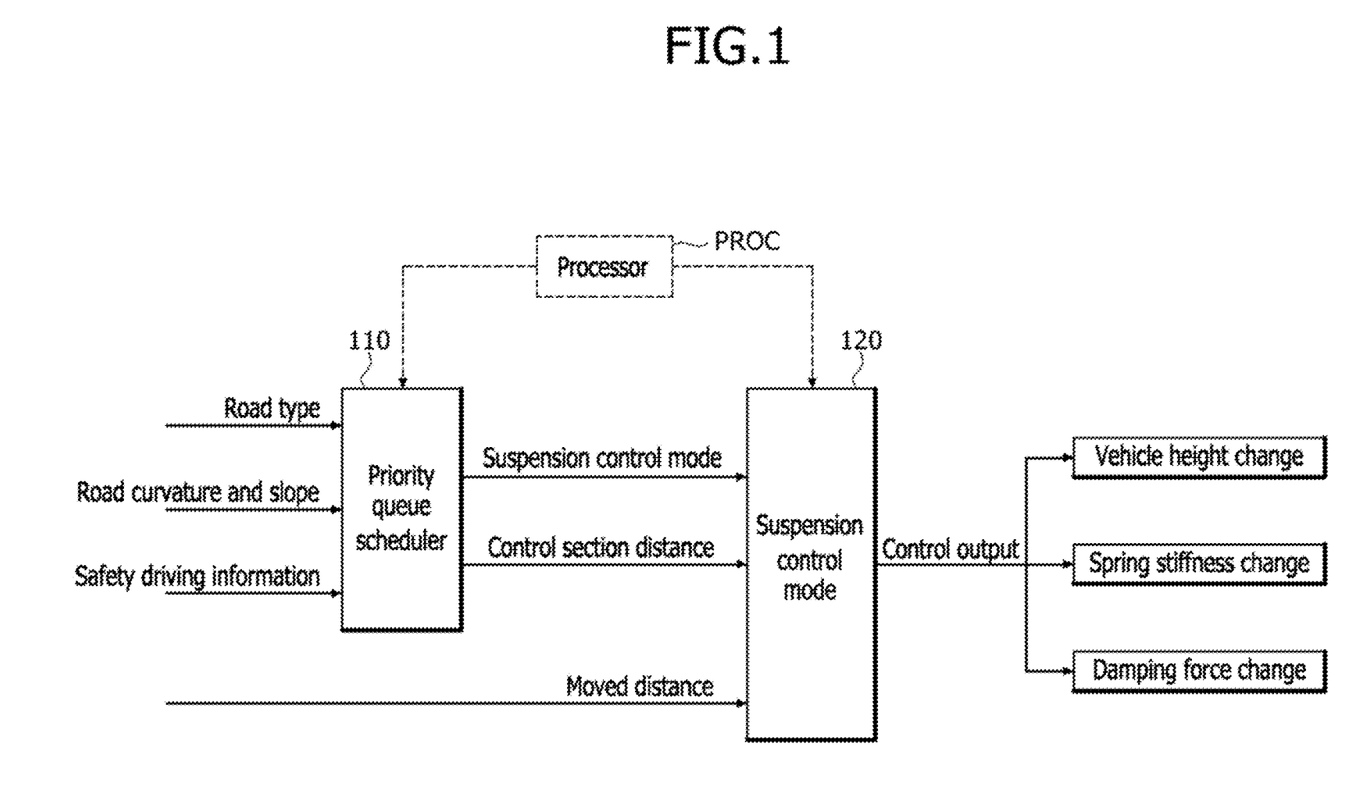
FIG. 1 is an exemplary diagram showing the schematic configuration of a priority-based suspension control apparatus in accordance with an embodiment of the present disclosure.
Figure 4:
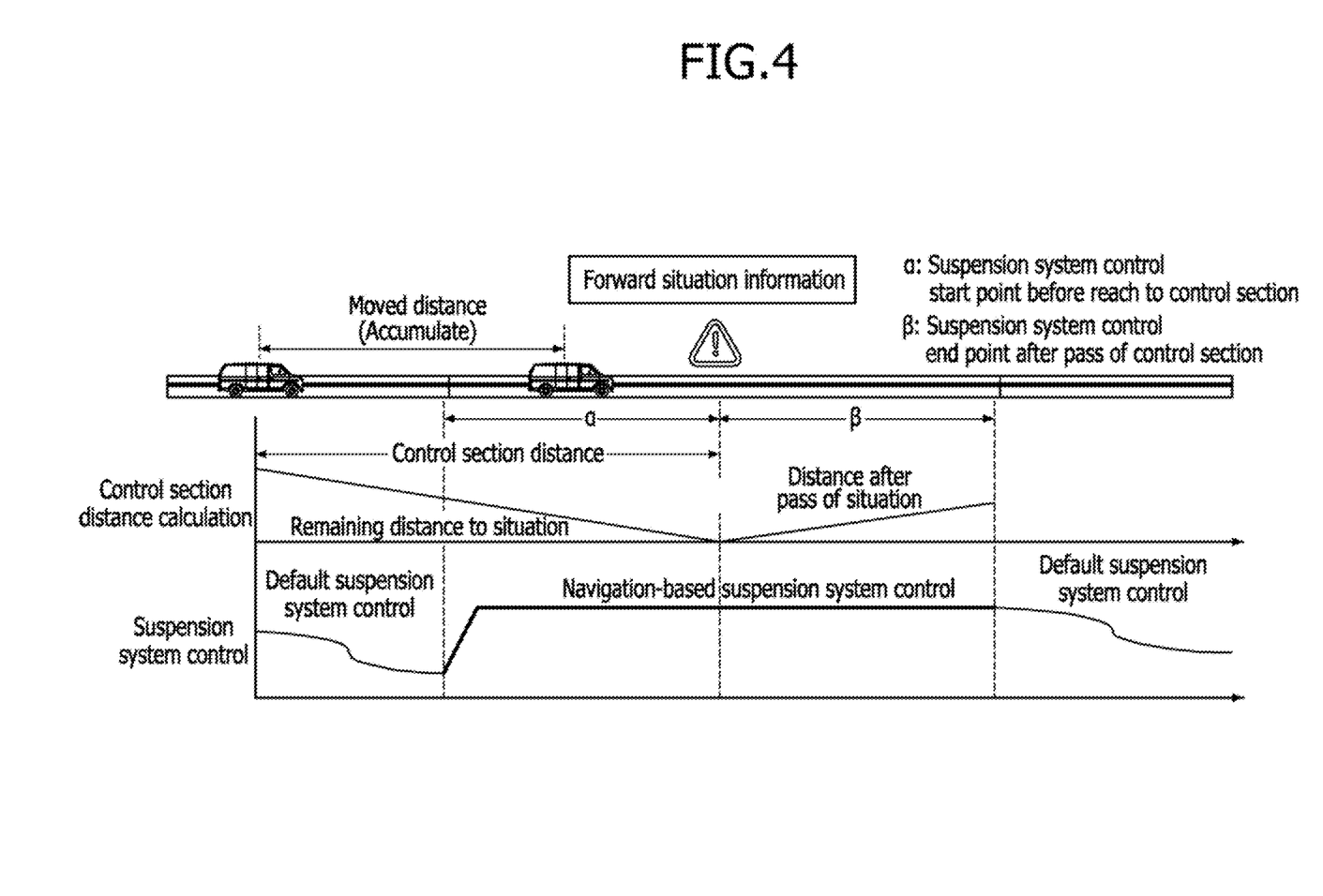
FIG. 4 is an exemplary diagram for explaining the control operation of a navigation-based suspension system in FIG. 1.

FIG. 1 is an exemplary diagram showing the schematic configuration of a priority-based suspension control apparatus in accordance with an embodiment of the present disclosure, and FIG. 4 is an exemplary diagram for explaining the control operation of a navigation-based suspension system in FIG. 1.

As shown in FIG. 1, the priority-based suspension control apparatus in accordance with the present embodiment includes a priority queue scheduler 110 and a suspension system control module 120.

The priority queue scheduler 110 and the suspension system control module 120 may be controlled by a processor PROC, or may be implemented in a form integrated with the processor PROC.

The priority queue scheduler 110 identifies a road type and road surface information, road curvature and slope information and safe driving information among forward situation information of a road, determines priorities of forward situations that influence the behavior of a vehicle, and generates a schedule for controlling a suspension system according to the determined priorities.

When the schedule for controlling the suspension system is generated, the priority queue scheduler 110 calculates a remaining distance to a control section of the road the vehicle is traveling on which has a high priority (see control section distance of FIG. 4), and at a suspension system control start point (see α of FIG. 4) before the designated control section is reached, outputs a suspension control mode to the suspension system control module 120.

The suspension system control module 120 accumulates moved distance information until the designated control section is reached, and subtracts a remaining distance to the designated control section (i.e., a forward situation to control suspension) (see remaining distance to situation of FIG. 4).

The suspension system control module 120 controls, at the suspension system control start point (see α of FIG. 4) before the designated control section is reached, the suspension system according to the suspension control mode outputted on the basis of the schedule generated according to the priorities of the forward situations by the priority queue scheduler 110. That is to say, the suspension system control module 120 controls changes in vehicle height, spring stiffness and damping force according to the schedule.

The priority-based suspension control apparatus in accordance with the present embodiment controls the suspension system in a default suspension control mode till the suspension system control start point (see α of FIG. 4) before the designated control section is reached. From after the suspension system control start point (see α of FIG. 4) before the designated control section is reached to till a suspension system control end point (see β of FIG. 4) after the designated control section is passed, the priority-based suspension control apparatus in accordance with the present embodiment performs navigation-based suspension system control. From after the suspension system control end point (see β of FIG. 4) after the designated control section is passed, the priority-based suspension control apparatus in accordance with the present embodiment controls the suspension system in the default suspension control mode again.

For example, in the present embodiment, by calculating a remaining distance to a control section with a high priority through moved distance information of a navigation, the control of the suspension system is started in a designated suspension control mode immediately before the vehicle enters the designated control section, and is ended after the vehicle exits the designated control section. When situation information from the navigation is not received or the priority queue scheduler 110 is empty by performing all controls scheduled in the priority queue scheduler 110, the suspension system is controlled in the default suspension control mode.

The priority queue scheduler 110 identifies information with a high priority among the forward situation information of the road, and manages the information with a high priority as a queue. When a situation with a high priority (e.g., a second priority such as a child protection zone of FIG. 3) is successively included while suspension control is performed in a situation with a low priority (e.g., a first priority such as a speed bump situation of FIG. 3), the priority queue scheduler 110 generates a schedule such that the suspension system is controlled in a suspension control mode corresponding to the second priority while being controlled in a suspension control mode corresponding to the first priority and is then controlled again in the suspension control mode corresponding to the first priority.

Figure 3:
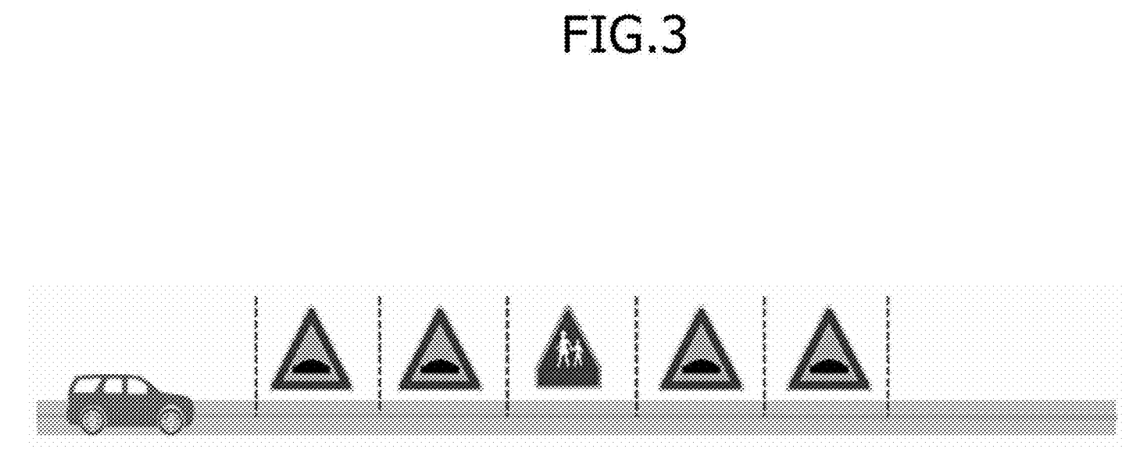
FIG. 3 is an exemplary diagram for explaining an operation of controlling a suspension system by identifying priorities of forward situation information.

FIG. 3 is an exemplary diagram for explaining an operation of controlling a suspension system by identifying priorities of forward situation information. Referring to FIG. 3, in the present embodiment, when a speed bump section and a child protection zone section overlap with each other, the control of the suspension system may be performed according to not information on a section inputted earlier but a situation with a high priority.

For example, when the child protection zone as a factor related with safety is set to have a high priority, in the present embodiment, 'child protection zone' control is preferentially performed while performing 'speed bump section' control, and when a 'child protection zone' is passed, the 'speed bump section' control may be performed again.

Figure 2:
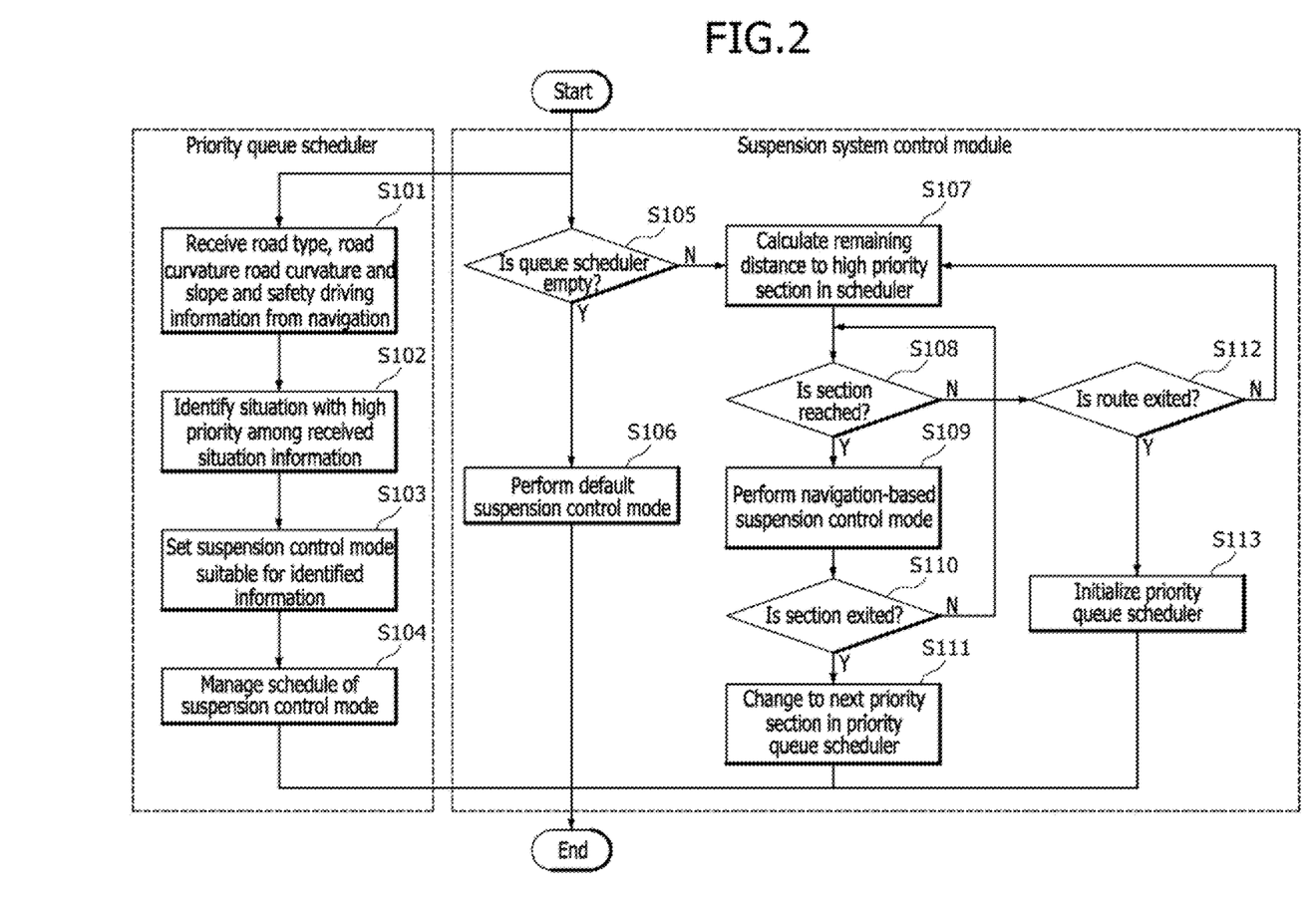
FIG. 2 is a flowchart for explaining a priority-based suspension control method in accordance with an embodiment of the present disclosure.

FIG. 2 is a flowchart for explaining a priority-based suspension control method in accordance with an embodiment of the present disclosure.

Referring to FIG. 2, under the control of the processor PROC, the priority queue scheduler 110 receives and stores predesignated situation information (e.g., road type, road curvature and slope and safe driving information) from the navigation (not shown) (S101).

The priority queue scheduler 110 identifies situation information with a high priority among the received situation information (S102), and sets a suspension control mode suitable for the identified situation information (S103).

The priority queue scheduler 110 manages the schedule of the suspension control mode according to a priority of each identified situation information (S104).

The suspension system control module 120 checks whether a queue scheduler (i.e., the priority queue scheduler 110) is empty (S105). When the queue scheduler (i.e., the priority queue scheduler 110) is empty (Y of S105), the suspension system control module 120 controls the suspension system in the default suspension control mode (S106).

However, when the queue scheduler (i.e., the priority queue scheduler 110) is not empty (N of S105), the suspension system control module 120 calculates a remaining distance to a section with a high priority in the priority queue scheduler 110 (S107).

The suspension system control module 120 checks whether the vehicle has reached a designated control section (S108). When a suspension system control start point (see α of FIG. 4) is reached before the designated control section is reached (Y of S108), the suspension system control module 120 performs a navigation-based suspension control mode, and performs a suspension control mode set in the queue scheduler (i.e., the priority queue scheduler 110) (S109).

The suspension system control module 120 checks whether the vehicle has exited the designated control section (S110). When the vehicle has exited a suspension system control end point (see β of FIG. 4) after passing the designated control section (Y of S110), the suspension system control module 120 manages a suspension control mode by changing a schedule to a next priority section in the queue scheduler (i.e., the priority queue scheduler 110) (S111).

By checking whether the vehicle has reached a designated control section (S108), when the vehicle has not reached the designated control section (N of S108), the suspension system control module 120 checks whether the vehicle has exited a route (S112). When the vehicle has exited the route (Y of S112), since situation information previously received from the navigation is meaningless (that is, cannot be used) on a current route, the suspension system control module 120 performs initialization of the queue scheduler (i.e., the priority queue scheduler 110) (S113).

When the vehicle has not reached the designated control section (N of S108) but has not exited the route (N of S112), the steps S107 to S111 are repeatedly performed.

As is apparent from the above description, in the present disclosure, by controlling a suspension system through a priority queue using various forward situation information inputted through a navigation, it is possible to respond to a high priority situation among various forward situation conditions, improve safety of a driver and a pedestrian in controlling a suspension system, and provide better steering stability and ride comfort to the driver and a passenger while reducing sense of heterogeneity of suspension control.

Although the present disclosure has been disclosed with reference to the embodiments illustrated in the drawings, the embodiments are only for illustrative purposes, and those skilled in the art will appreciate that various modifications and other equivalent embodiments are possible, without departing from the scope and spirit of the present disclosure as defined in the accompanying claims. Thus, the true technical scope of the disclosure should be defined by the following claims.

What is claimed is:

1. A priority-based suspension control apparatus comprising:
 a priority queue scheduler configured to receive forward situation information of a road, determine a priority of a forward situation that influences behavior of a vehicle on the road, and generate a schedule for controlling a suspension system of the vehicle, according to the determined priority; and
 a suspension system control module configured to control, at a suspension system control start point before a designated control section of the road, where the forward situation exists, is reached by the vehicle, the suspension system according to a suspension control mode outputted based on the schedule generated by the priority queue scheduler,
 wherein:
 the priority-based suspension control apparatus is configured to:
  control the suspension system in a default suspension control mode until the suspension system control start point before the designated control section is reached,
  from a period of time after the suspension system control start point before the designated control section is reached until a suspension system control end point after the designated control section is passed, perform a navigation-based suspension system control using the suspension control mode, and
  from a period of time after the suspension system control end point after the designated control section is passed, control the suspension system in the default suspension control mode again,
 the priority queue scheduler is configured to identify information with different levels of priority among the forward situation information of the road, each of the different levels of priority being higher than a priority of the default suspension control mode, and to manage the forward situation information as a queue based on the different levels of priority,
 when a second priority situation with a second priority higher than a first priority of a first priority situation is successively included while suspension control is being performed in the first priority situation using a first suspension control mode, the priority queue scheduler is configured to control the suspension system in a second suspension control mode corresponding to the second priority rather than controlling the suspension system in the first suspension control mode corresponding to the first priority, and
 the priority queue scheduler is configured to generate a schedule to control the suspension system in the first suspension control mode corresponding to the first priority again when the second priority situation is ended.

2. The priority-based suspension control apparatus of claim 1, wherein, when the schedule for controlling the suspension system is generated, the priority queue scheduler is configured to calculate a remaining distance to the designated control section of the road, wherein the designated control section is a control section with a higher priority than other control sections of the road, and, at the suspension system control start point before the designated control section is reached, to output the suspension control mode to the suspension system control module.

3. The priority-based suspension control apparatus of claim 1, wherein the priority queue scheduler and the suspension system control module are controlled by a processor or are implemented in a form integrated with a processor.

4. The priority-based suspension control apparatus of claim 1, wherein:
the designated control section is a control section of the road with a higher priority than other control sections of the road, based on information of a navigation system of the vehicle,
by calculating a remaining distance to the designated control section, the priority-based suspension control apparatus starts control of the suspension system in a designated suspension control mode immediately before the vehicle enters the designated control section, and ends the control of the suspension system in the corresponding suspension control mode after the vehicle exits the designated control section, and
when situation information from the navigation system is not received or the priority queue scheduler is empty due to having performed all controls scheduled in the priority queue scheduler, the priority-based suspension control apparatus is configured to control the suspension system in a default suspension control mode.

5. The priority-based suspension control apparatus of claim 1, wherein the priority queue scheduler is configured to receive forward situation information of the road, to identify a road type, road surface information, road curvature, slope information and safe driving information from the received forward situation information, and based on the information identified from the received forward situation information, determine a priority of a forward situation that influences behavior of the vehicle.

6. A priority-based suspension control method comprising:
receiving forward situation information of a road;
determining a priority of a forward situation that influences behavior of a vehicle on the road;
generating a schedule for controlling a suspension system of the vehicle, according to the determined priority, by a priority queue scheduler; and
controlling, at a suspension system control start point before a designated control section of the road, where the forward situation exists, is reached by the vehicle, the suspension system according to a suspension control mode outputted based on the schedule generated according to the priority of the forward situation by the priority queue scheduler, by a suspension system control module,
wherein:
the priority-based suspension control method further comprises:
controlling the suspension system in a default suspension control mode until the suspension system control start point before the designated control section is reached,
from a period of time after the suspension system control start point before the designated control section is reached until a suspension system control end point after the designated control section is passed, performing a navigation-based suspension system control using the suspension control mode, and
from a period of time after the suspension system control end point after the designated control section is passed, controlling the suspension system in the default suspension control mode again,
the priority queue scheduler is configured to identify information with different levels of priority among the forward situation information of the road, each of the different levels of priority being higher than a priority of the default suspension control mode, and to manage the forward situation information as a queue based on the different levels of priority,
when a second priority situation with a second priority higher than a first priority of a first priority situation is successively included while suspension control is being performed in the first priority situation using a first suspension control mode, the priority queue scheduler is configured to control the suspension system in a second suspension control mode corresponding to the second priority rather than controlling the suspension system in the first suspension control mode corresponding to the first priority, and
the priority queue scheduler is configured to generate a schedule to control the suspension system in the first suspension control mode corresponding to the first priority again when the second priority situation is ended.

7. The priority-based suspension control method of claim 6, wherein in the generating of the schedule for controlling the suspension system according to the priority, the priority queue scheduler receives and stores predesignated situation information from a navigation system of the vehicle, identifies situation information with a high priority among the received situation information, sets a predetermined suspension control mode based on the identified situation information with the high priority, and manages the schedule of the suspension control mode according to a priority of each identified situation information.

8. The priority-based suspension control method of claim 6, wherein in the controlling of the suspension system according to the suspension control mode outputted on a basis of the schedule generated according to the priority of the forward situation, the suspension system control module checks whether the priority queue scheduler is empty, calculates, when the priority queue scheduler is not empty, a remaining distance to the designated control section with a high priority in the priority queue scheduler, performs, when a suspension system control start point is reached before the designated control section is reached by the vehicle, a navigation-based suspension control mode as a suspension control mode set in the priority queue scheduler, and manages, when a suspension system control end point is exited after the designated control section is passed, a suspension control mode by changing a schedule to a next priority section in the priority queue scheduler.

* * * * *